United States Patent [19]
Morgan

[11] Patent Number: 5,345,635
[45] Date of Patent: Sep. 13, 1994

[54] ICE AXE SHOVEL ATTACHMENT

[76] Inventor: Richey Morgan, 13653 Bandix Rd. SE., Olalla, Wash. 98359

[21] Appl. No.: 116,575

[22] Filed: Sep. 7, 1993

[51] Int. Cl.$^5$ .............................................. A01B 1/20
[52] U.S. Cl. .......................................... 7/116; 294/51
[58] Field of Search ............... 294/49, 51, 52, 53.5, 294/54.5, 59; 7/114, 116, 158, 159; 30/122, 308.1, 308.3

[56]  References Cited
U.S. PATENT DOCUMENTS

| | | | |
|---|---|---|---|
| 91,586 | 6/1869 | Alexander | 7/116 |
| 368,013 | 8/1887 | Schad | 294/51 |
| 634,696 | 10/1889 | Michie | 7/116 |
| 1,068,792 | 7/1913 | Mackintosh | 7/116 |
| 1,220,666 | 3/1917 | McCormick | 294/51 X |
| 1,326,108 | 12/1919 | Seelye | 294/51 |
| 2,254,586 | 9/1941 | Warwick | 294/59 X |
| 2,665,434 | 1/1954 | Saunders | 7/114 |
| 3,334,939 | 8/1967 | Bonic | 294/51 |
| 3,561,023 | 2/1971 | Shandel | 7/116 |
| 4,475,756 | 10/1984 | Reading | 294/51 |

FOREIGN PATENT DOCUMENTS 3235509  3/1984  Fed. Rep. of Germany .......... 7/116

Primary Examiner—Johnny D. Cherry
Attorney, Agent, or Firm—Norman B. Rainer

[57] ABSTRACT

A shovel blade attachment is provided for a conventional mountain climber's axe. The shovel blade adds several utilitarian functions to the ice axe and is easily attached to and removed from the axe. A U-shaped threadably urged securement bolt ensures reliable tight attachment of the blades to the head of the axe.

5 Claims, 4 Drawing Sheets

ICE AXE SHOVEL ATTACHMENT

BACKGROUND OF THE INVENTION

1. Field of the Invention

This invention relates to mountaineering equipment and more particularly concerns a shovel and trenching tool blade attachment adapted to be affixed to a climber's ice axe.

Climbing in snow is a fundamental part of mountaineering. Climbers like snow for several reasons. First of all, it makes many climbs a lot easier by providing a pathway over brush and other obstacles on the approach hike and reducing the danger of loose rock on the ascent. It also brings new beauty to the mountains and conceals the impact of people upon the environment.

Snow is a complex medium that shows up in many forms that continually change, making snow travel trickier than trail hiking or rock climbing. Snow falls in a form that varies from tiny crystals to coarse pellets, depending on temperature and wind. Once fallen, snow begins to change as it is acted upon by sun, wind, temperature variations, and precipitation. Even in the course of a day, the snow can change from rock hard in the morning to thigh-sucking slush in the afternoon and back again by evening.

The ice axe is one of the most versatile and important pieces of mountaineering equipment a climber owns. Without it, safe alpine travel is restricted to easy scrambles. With an axe, and the skill to use it, the climber can venture onto all forms of snow and ice, enjoying a greater variety of mountain landscapes during more seasons of the year.

The modern ice axe is an inherently simple tool with many uses. Below the snow line, it's used for balance, as a walking cane, and to help brake going downhill. But its main role is in snow and ice travel, where it provides balance and a point of security or safety to prevent or arrest a fall. It is also used to chop steps in icy snow for foot holds and can be used as a brake for a controlled sliding technique known as glissading. Furthermore, it can become a snow anchor when buried in the snow.

The ice axe has several parts: 1) the head, which includes A) the pick, namely a pointed protrusion, and B) the adze, a curved flat scoop extending opposite the pick, 2) the shaft, a rounded or oval tube of various lengths made of aluminum alloy, titanium or a composite material (fiberglass Kevlar or carbon filament), and 3) the spike, a sharp steel tip on the opposite end of the shaft from the head.

The pick on most ice axes is curved or drooped, a design that provides better hooking action in snow or ice, causing the axe to dig in faster when trying to stop oneself after a fall. A moderate hooking angle of 65 to 70 degrees from the shaft is typical for general mountaineering uses. A sharper angle of 55 to 60 degrees is commonplace for technical ice climbing, as it coincides with the arc followed by the axe head when it is planted in steep ice. Some ice climbing axes permit adjustable bolted pick angles. However, over 90% of the ice axes in use are for snow climbing, and have a moderate hooking angle of 65 to 70 degrees. The head is made of $\frac{1}{8}$ to 3/16 steel alloy stamped out before hardening. The adze part of the ice axe is either attached before hardening by welding or simply formed by a quarter turn of the heat-softened head. Any of these designs are suited for the invention now being proposed.

The most critical function of the ice axe is a maneuver referred to as self-arrest. Self-arrest is the lifesaving technique of using the ice axe to stop the climber's uncontrolled or accidental slide down a snow slope. If unroped, it offers the only chance to stop the slide. It's the single most important snow-climbing skill. The technique also serves to brace a climber solidly in the snow if he has to hold the fall of a rope-mate. Therefore, a climber's own life and those of fellow climbers could hinge on self-arrest.

In the self-arrest maneuver, the hands hold the axe in a solid grip, one hand with thumb under the adze and fingers over the pick, the other hand on the shaft just above the spike.

The pick is pressed into the snow just above the climbers shoulder so that the adze is near the angle formed by the neck and shoulder.

The shaft crosses the chest diagonally and is held close to the opposite hip. Gripping the shaft near the end prevents that hand from acting as a pivot around which the spike can swing to jab the thigh. The chest and shoulder are pressed strongly down on the ice-axe shaft. The spine is arched slightly away from the snow. This arch is critical; it places the bulk of the climber's weight on the axe head and on the toes or knees, the points that dig into the snow to force a stop.

A common problem experienced by climbers occurs when a climb is being made along a steep, near vertical surface in soft snow, semi-firm snow or soft crust. If the snow were solidly packed or ice, the climber would simply use the axe in the above manner. However, on this softer type snow the above self-arrest technique does not work. The pick head may be sunk into the snow to its fullest extent and the falling climber continues to accelerate. The narrow pick simply cannot generate enough drag or braking force to slow the person. The adze does not have enough area to provide any significant braking force either. The spike is the only part that can generate enough braking force by being sunk deeply into the snow. However, the only safe way to hold this position is in a sitting glissade position which is not considered a safe self-arrest position.

The book: Mountaineering, Freedom of the Hills, 5th edition (considered the "bible" of mountaineering) contains an illustration on page 289 indicating that rolling toward the spike for self-arrest is incorrect while also stating on that same page under "Variations" that the greatest possible drag from the ice axe on loose snow may be in this position. Thus, a danger does exist by losing control on this position. It is for these types of snow that this invention is proposed. Snow conditions vary from hard ice, where even a very sharp pick has difficulty penetrating, to very loose "powder" where an ice axe may not be needed at all to stop a fall. Actually, mountaineers may encounter both in the course of a winter climb along with all types in between.

Another mountain climbing skill performed with the ice axe is self-belay. It is usually performed on gentle to semi-steep slopes with the spike used like a walking cane for control and an anchor point for a slip. On steep slopes, a climber can make a direct assault by chopping the pick into the snow and pulling with the arms while climbing with the legs. (Commonly known as "climbing on all fours"). The pick serves as the anchor point if the legs slip. Ice climbers use two small ice climbing axes (one in each hand) and crampons on their boots to work their way up a slope "on all fours." Again, this technique does not work on semi-firm snow, soft snow or soft crust, since the narrow pickhead pulls too easily through the snow. This problem is resolved also by this invention.

Two other ice axe functions are enhanced by virtue of the improvement of the present invention. The first is a technique know as glissading. Glissading, as mentioned earlier is a self-controlled slide down a snow slope, most commonly done in a sitting position (which is its most stable and safe position) wherein the spike is dug into the snow for braking purposes. It is an easy and enjoyable way to descend hard to semifirm snowfields which have enough angle to the slope to slide. This invention provides an additional position for soft or semifirm snow wherein the shovel attachment is employed for braking effect.

The second function improved by virtue of the present invention is that wherein the ice axe is used as a snow anchor. Climbers frequently use snow anchors and pickets for attaching ropes to belay. The ice axe can be buried vertically or horizontally (as a "dead man anchor") in the snow for rope attachment. The present invention enables the ice axe to be used as a snow anchor by burying or sinking the entire unit beneath the snow and attaching a rope to the handle.

A broad-bladed shovel is another utility and safety tool for snow travel. It's the only practical tool currently available for uncovering an avalanche victim. Shovels are also used for digging snow shelters and leveling off tent platforms and have been used as a climbing tool to shovel a pathway up a particularly snowy route.

A good snow shovel has a blade large enough to move snow efficiently and a handle long enough for good leverage but short enough for use in a confined area. Some snow shovels come with a detachable handle or with a blade that locks perpendicular to the handle so it can be used as a trenching tool. For projects such as building snow caves, mountaineers sometimes carry a grain scoop, a broad-bladed shovel that can move a lot of snow.

Mountaineers are extremely conscious of the weight and bulk of gear that they carry because it represents added effort and encumbrance in climbing. Therefore, the need to carry an extra shafted tool such as a shovel must be weighed against its encumbrance. There may be no way to rescue an avalanche victim or dig an emergency snow shelter (snow cave) without a shovel. This invention provides a small lightweight solution to this problem.

2. Description of the Prior Art

Numerous shovel adapters have been disclosed in the prior art. Various blades have been employed in attempts to extend the versatility of hammers, picks, scrapers and other tools. For example, U.S. Pat. No. 4,475,756 to Reading discloses a Shovel adapter for a geologist's hammer. The blade has a plurality of slots adapted to receive the pick end of the hammer. It is locked in place with locking hardware. By virtue of the design of the shovel blade and locking hardware, the adapter is not quickly deployed and removed. Furthermore, when not deployed upon the hammer, it must be stored separately. There is no non-deployed storage position for the blade.

U.S. Pat. No. 3,334,939 to Bonic discloses a combination snow shovel and ice scraper in which the shovel blade may be locked into place upon the scraper blade. This mounting disposes the shovel blade in a plane common with, rather than orthogonal to, the shaft of the tool. When not deployed upon the scraper, the shovel blade must be stored separately as well.

Neither of these shovel devices are amenable to use with an ice axe.

It is therefore an object of the present invention to provide a spade attachment for an ice axe which permits the use of the ice axe as a shovel or trenching tool while enhancing its gripping ability in loose snow in self-belaying and self-arresting maneuvers.

It is another object of the present invention to provide a spade attachment of the aforesaid nature which may be quickly and easily deployed and removed.

It is a further object of this invention to provide a spade attachment of the aforesaid nature adaptable to a myriad of commercially available ice axes.

It is yet another object of this invention to provide a spade attachment of the aforesaid nature which may be stored in non-operative association with the ice axe.

It is still another object of this invention to provide a spade attachment of the aforesaid nature which is lightweight, durable, and amenable to low cost manufacture.

It is another object of this invention to make use of the top surface of the spade for printing safety messages for climbers. This is appropriate to its relation to safety (avalanche rescue, emergency snow shelter, self arrest). This may be stamped into the metal or molded if the spade is made of plastic.

These and other beneficial objects and advantages will be apparent from the following description.

SUMMARY OF THE INVENTION

The above and other beneficial objects and advantages ape accomplished in accordance with the present invention by a shovel blade attachment for an ice axe having a handle shaft elongated upon a center axis and a head affixed thereto, said head having an adze extremity and opposed pick extremity curved toward said shaft and having a flat configuration coplanar with the shaft axis, said attachment comprising:

a) a shovel blade of monolithic construction having upper and lower surfaces, opposed side edges, rear edge, and a front edge, a straight trough-like groove downwardly recessed from said upper surface and extending between said front and rear edges in parallel disposition to said side edges and midway therebetween, said groove being centered upon a plane of symmetry of said blade and configured to receive said pick extremity, a shaft-receiving hole centered upon said groove adjacent said rear edge, paired mounting slots communicating with said hole and forwardly directed therefrom, and at least one pair of mounting apertures in equidistant opposition about said groove upon a locus orthogonal to said groove, said blade being downwardly bent between said front and rear edges, and b) securement means adapted to be positioned above said upper surface in straddling relationship with said groove while penetrating said blade and adapted to exert upward force upon said lower surface in a manner to force said groove into secure engagement with the head of said axe.

A preferred quick-acting securement means is a clamp of substantially U-shaped contour comprising an upper portion and opposed leg portions defining therebetween a passage configured to slidably fit upon the flat configuration of the head of said axe, said leg portions having lowermost footing extremities equipped with track means configured to slide within said mounting slots, a threaded bore penetrating said upper portion upon an axis centered with respect to said passage, a threaded bolt extending through said bore, and bolt turning means affixed to said bolt above the upper portion of said clamp, whereby tightening movement of said bolt causes said bolt to abut the head of the axe, causing the track means to rise into tight abutment with the lower surface of the blade, urging the groove into secure engagement with the head of the axe.

In a further embodiment, auxiliary securing means in the form of a threaded U-bolt interactive with said mounting apertures is provided to permit an additional mode of securement of the blade to the axe.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
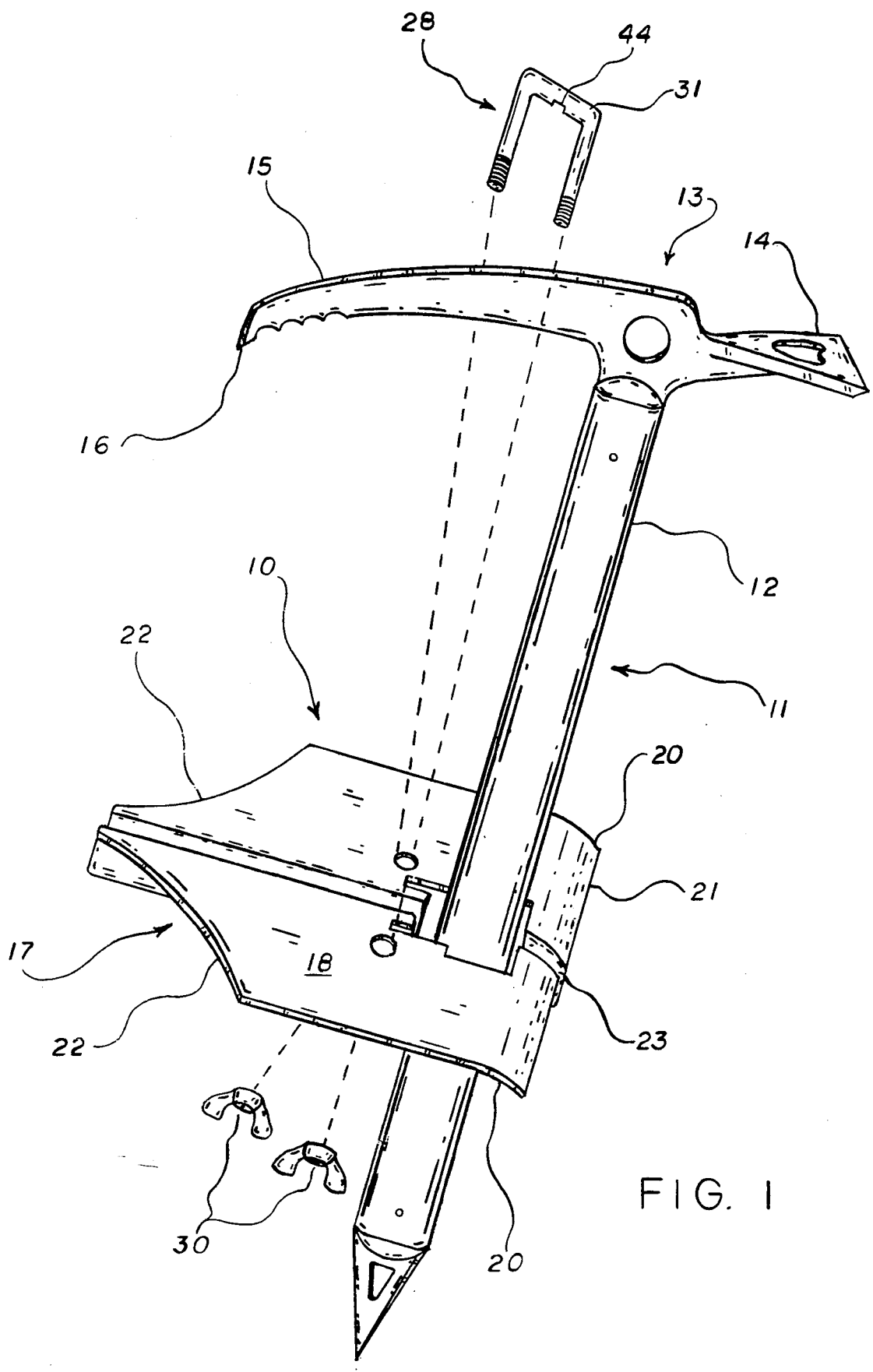
FIG. 1 is a top perspective view of an embodiment of the blade attachment of this invention shown in exploded association with an ice axe of conventional design.

Referring to FIGS. 1-6, an embodiment of the blade attachment 10 of the present invention is shown in association with a conventional mountain or ice axe 11 comprised of handle shaft 12 and head 13 affixed thereto, said head having a adze extremity 14 and opposed flat pick portion 15 terminating in point 16.

Said attachment is comprised of shovel blade 17 of monolithic construction, fabricated of a non-breakable material such as aluminum or titanium. Blade 17 has upper and lower surfaces 18 and 19, respectfully, opposed side edges 20, rear edge 21 spanning said side edges, and V-shaped front edge 22 forwardly and symmetrically tapered from said side edges. The length of blade 17, measured between said rear edge and the forwardmost part of front edge 22, is smaller than the length of the head of the mountain axe with which blade 17 will be associated. Front edge 22 may alternatively be of square or other configuration. The blade is downwardly bent between said front and rear edges. The blade may alternatively be fabricated of an engineering grade plastic by way of a molding operation.

A straight trough-like groove 23 downwardly recessed from upper surface 18 extends between said front and rear edges in parallel disposition to side edges 20 and midway therebetween. Groove 23 is centered upon a plane of symmetry of blade 17 denoted by broken line 24 of FIG. 4. The width of groove 23 is such as to slidably receive pick portion 15.

A shaft-receiving hole 25 is centered upon groove 23 adjacent rear edge 21. Although exemplified in FIG. 5 as having a substantially rectangular contour, other contours are contemplated, said contour being selected so as to make close-fitting sliding contact with handle shaft 12, Paired parallel mounting slots 26 communicate with hole 25 and are forwardly directed therefrom toward front edge 22.

The function of said mounting slots is to receive quick-acting securement means, as will hereinafter be shown, Similarly, a pair of mounting apertures 27 is provided to receive securement means in the form of threaded U-bolt 28. Apertures 27 are disposed in equidistant opposition about groove 23 and upon a locus orthogonal to said plane of symmetry.

When it is desired to attach blade 17 to the mountain axe, the handle of the axe is inserted through hole 25, and the blade is slidably advanced toward head 13 such that front edge 22 is aligned with pick portion 15, and groove 23 positioned to receive the lower edge 29 of said pick portion. When said pick portion is seated within groove 23, securement means are utilized to maintain the blade in tight association with head 13.

Figure 2:
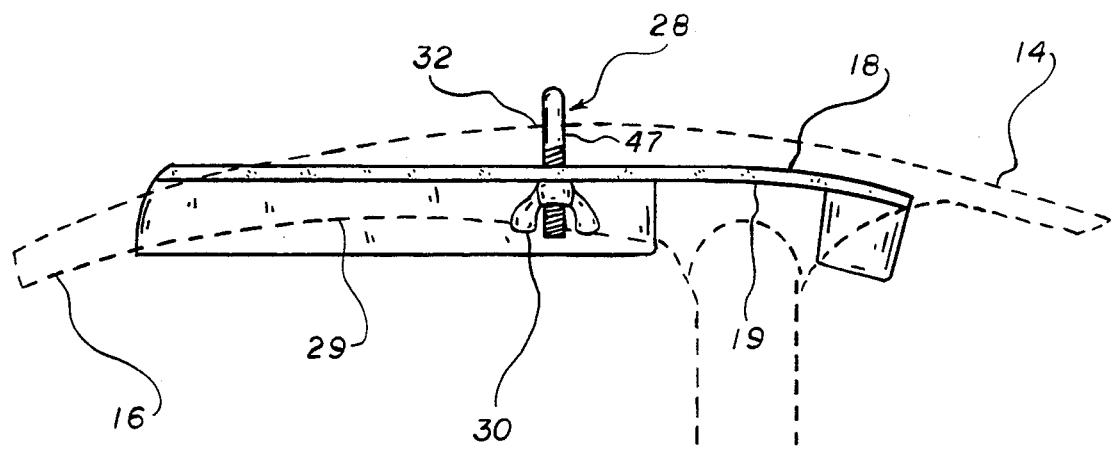
FIG. 2 is a side view.

In the embodiment illustrated in FIGS. 1 and 2, the securement means is in the form of U-bolt 28 having straight threaded legs 47 configured to penetrate blade 17 from upper surface 18. Once legs 47 have penetrated the blade, threaded wing nuts 30 interactive with legs 47 are applied until tight abutment is achieved with lower surface 19. Such action also causes cross bar portion 31 of bolt 28 to be forced downwardly upon the upper edge 32 of pick portion 15, thereby causing tight embracement of said pick portion. Cross bar portion 31 contains a recess 44 that receives upper edge 32 in a manner to prevent rocking or sideways movement of the secured blade.

Figure 3:
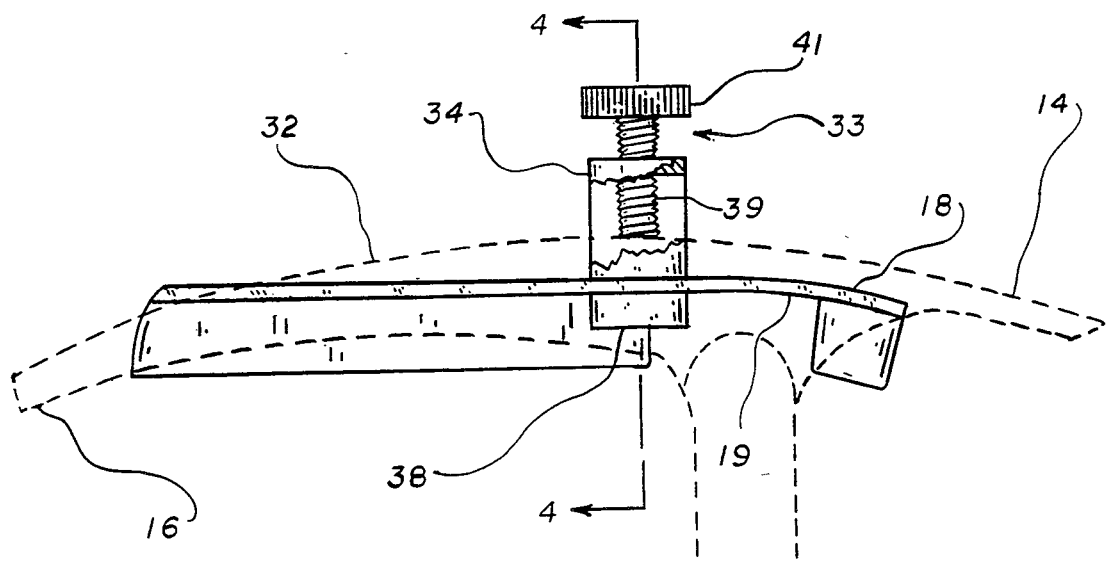
FIG. 3 is a side view of an embodiment of the blade attachment utilizing securement means alternative to that shown in FIGS. 1 and 2.
Figure 4:
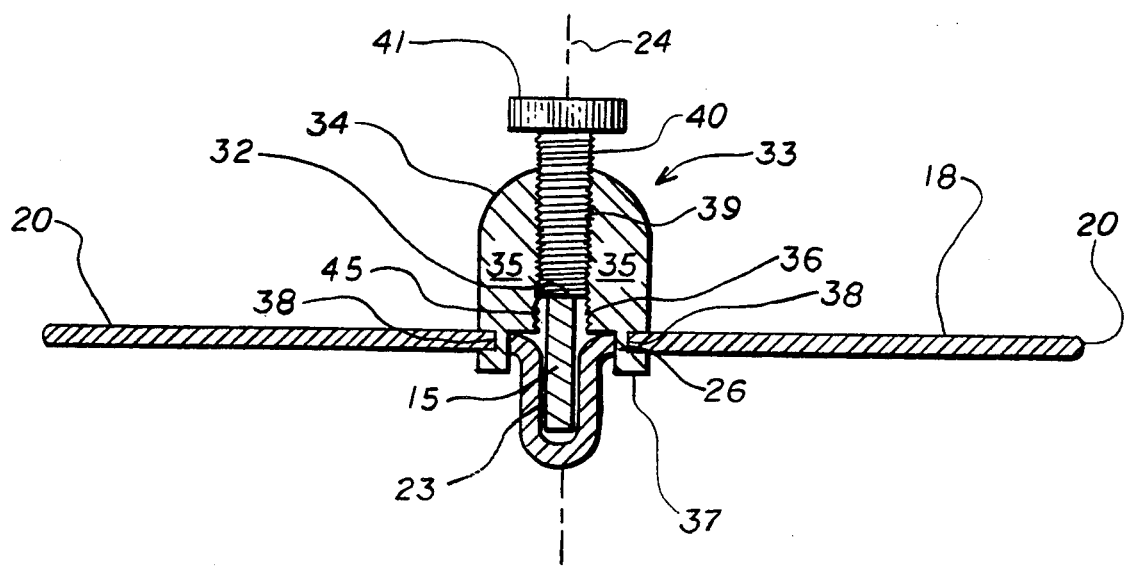
FIG. 4 is a sectional view taken upon the line 4—4 of FIG. 3.
Figure 5:
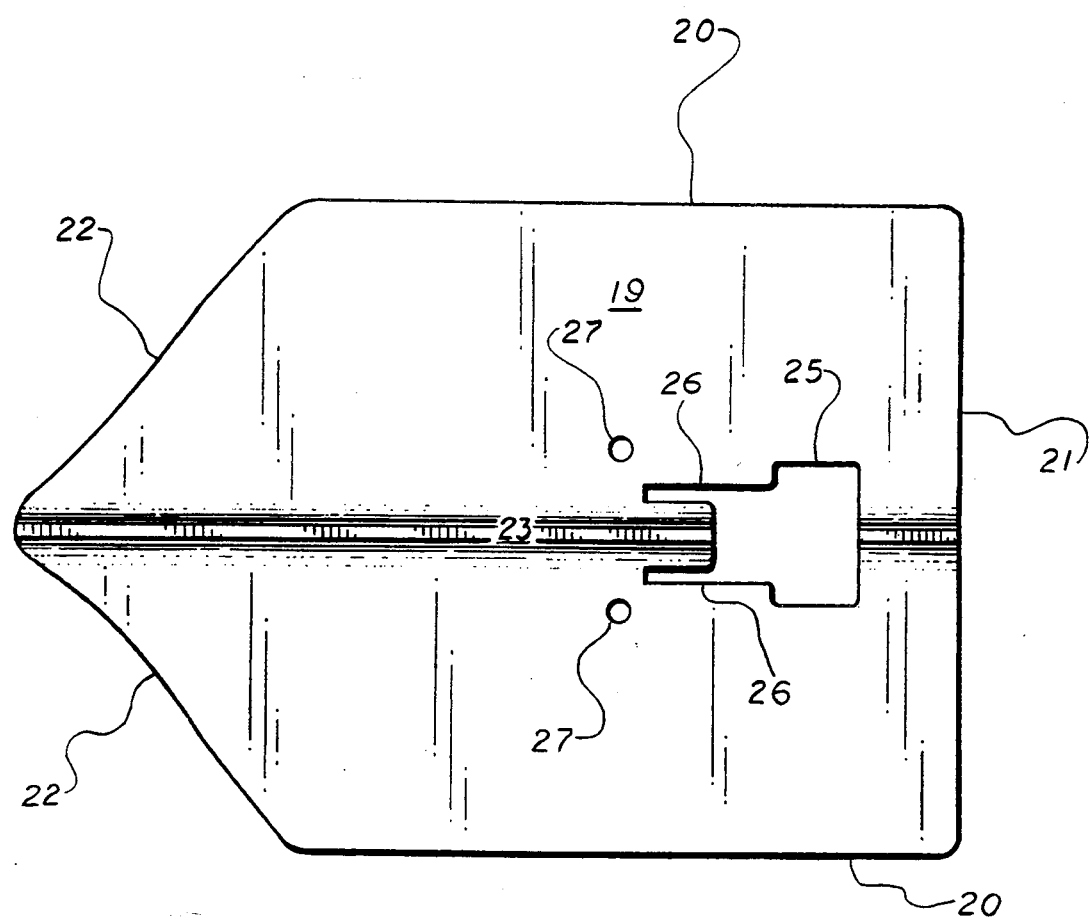
FIG. 5 is a bottom view.
Figure 6:
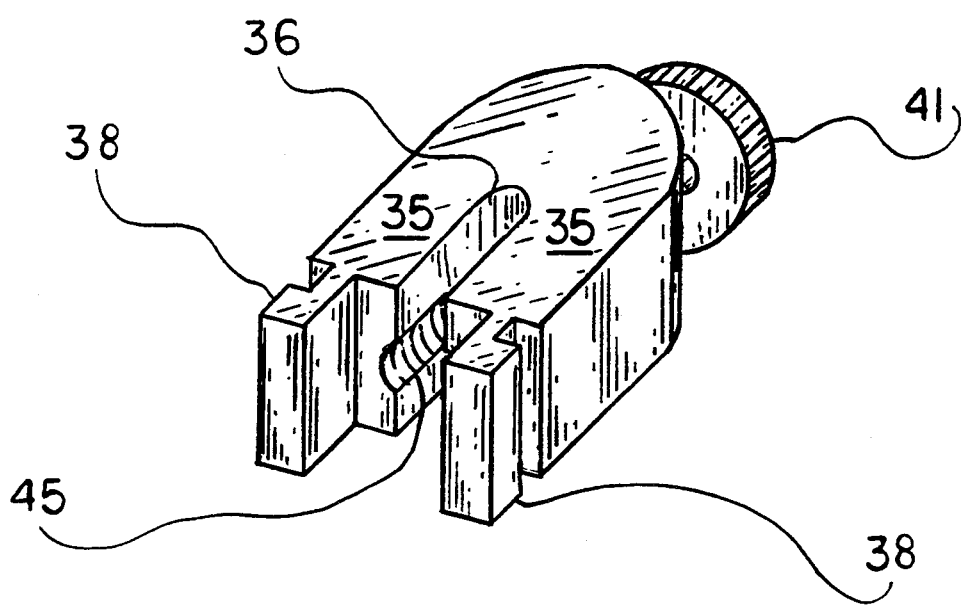
FIG. 6 is a perspective view of an embodiment of securement means useful with the blade attachment of FIG. 1.

An alternative embodiment of securement means is exemplified in the form of quick-acting clamp 33 shown in FIGS. 3, 4 and 6, Said clamp is of substantially U-shaped contour having an upper portion 34 and opposed leg portions 35 defining therebetween a passage 36 configured to slidably fit upon the flat pick portion of head 13.

Said leg portions have lowermost footing extremities 37 equipped with track means 38 configured to slide within mounting slots 26. A threaded bore 39 penetrates said upper portion 34 upon an axis centered with respect to passage 36. Threaded recesses 45 within leg portions 35 of passage 36 represent a continuation of bore 39. A threaded bolt 40 extends through said bore. Typically, bolt 40 will have a $\frac{3}{8}''$ diameter, and passage 36 will have a $\frac{1}{4}''$ width. Bolt-turning means in the form of knurled knob 41 is affixed to bolt 40 above upper portion 34. Tightening movement of bolt 40 causes said bolt to abut the upper edge 32 of pick portion 15 while simultaneously causing track means 38 to rise into tight abutment with lower surface 19. Such action urges groove 23 into secure engagement with pick portion 15. By virtue of the quickly acting nature of clamp 33, the climber can apply shovel blade 17 to the head of axe 11 even while precariously interactive with the mountain. Clamp 33 cannot jar loose as a result of forward impact, chopping, striking or digging action.

While particular examples of the present invention have been shown and described, it is apparent that changes and modifications may be made therein without departing from the invention in its broadest aspects.

The aim of the appended claims, therefore, is to cover all such changes and modifications as fall within the true spirit and scope of the invention.

Having thus described my invention, what is claimed is:

1. A shovel blade attachment for an ice axe having a handle shaft elongated upon a center axis and a head affixed thereto, said head having an adze extremity and opposed pick extremity curved toward said shaft and having a flat configuration coplanar with the shaft axis, said attachment comprising:

a) a shovel blade of monolithic construction having upper and lower surfaces, opposed side edges, a rear edge, and a front edge, a straight trough-like groove downwardly recessed from said upper surface and extending between said front and rear edges in parallel disposition to said side edges and midway therebetween, said groove being centered upon a plane of symmetry of said blade and configured to receive said pick extremity, a shaft-receiving hole centered upon said groove adjacent said rear edge, and at least, one pair of mounting apertures in equidistant opposition about said groove upon a locus orthogonal to said groove, said blade being downwardly bent between said front and rear edges, and b) securement means adapted to be positioned above said upper surface in straddling relationship with said groove while penetrating said blade and adapted to exert upward force upon said lower surface in a manner to force said groove into secure engagement with the head of said axe.

2. The shovel blade attachment of claim 1 wherein said front edge is V-shaped by virtue of a forwardly directed symmetrical taper emergent from said side edges.

3. The shovel blade attachment of claim 1 wherein said securement means is a U-bolt having threaded legs configured to penetrate said mounting apertures in a manner to embrace said groove and pick extremity seated within said groove, and threaded fasteners which engage said legs in abutment with the lower surface of said blade.

4. The shovel blade attachment of claim 1 further comprised of paired parallel mounting slots communicating with said shaft-receiving hole, and forwardly directed therefrom toward said front edge.

5. The shovel blade attachment of claim 4 wherein said securement means is a quick-acting clamp of U-shaped contour having an upper portion and opposed leg portions defining a passage that embraces said pick extremity, said leg portions having footing extremities configured to slide within said mounting slots, a threaded bore penetrating said upper portion upon an axis centered with respect to said passage, and a threaded bolt extending through said bore and adapted to abut said pick extremity confined with said groove.

* * * * *